March 11, 1958  K. K. MERGET  2,826,102
MECHANICAL BORING BAR
Filed April 19, 1955  2 Sheets-Sheet 1
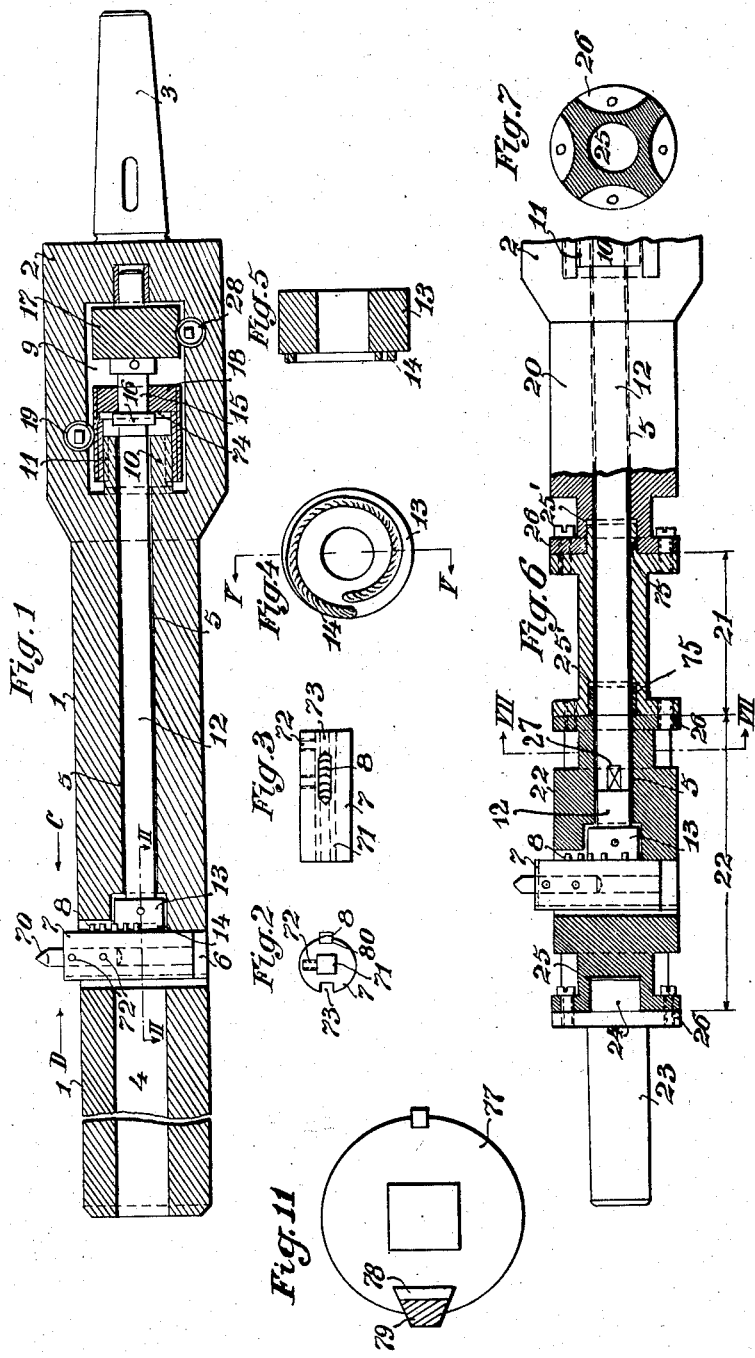

March 11, 1958  K. K. MERGET  2,826,102
MECHANICAL BORING BAR
Filed April 19, 1955 2 Sheets-Sheet 2
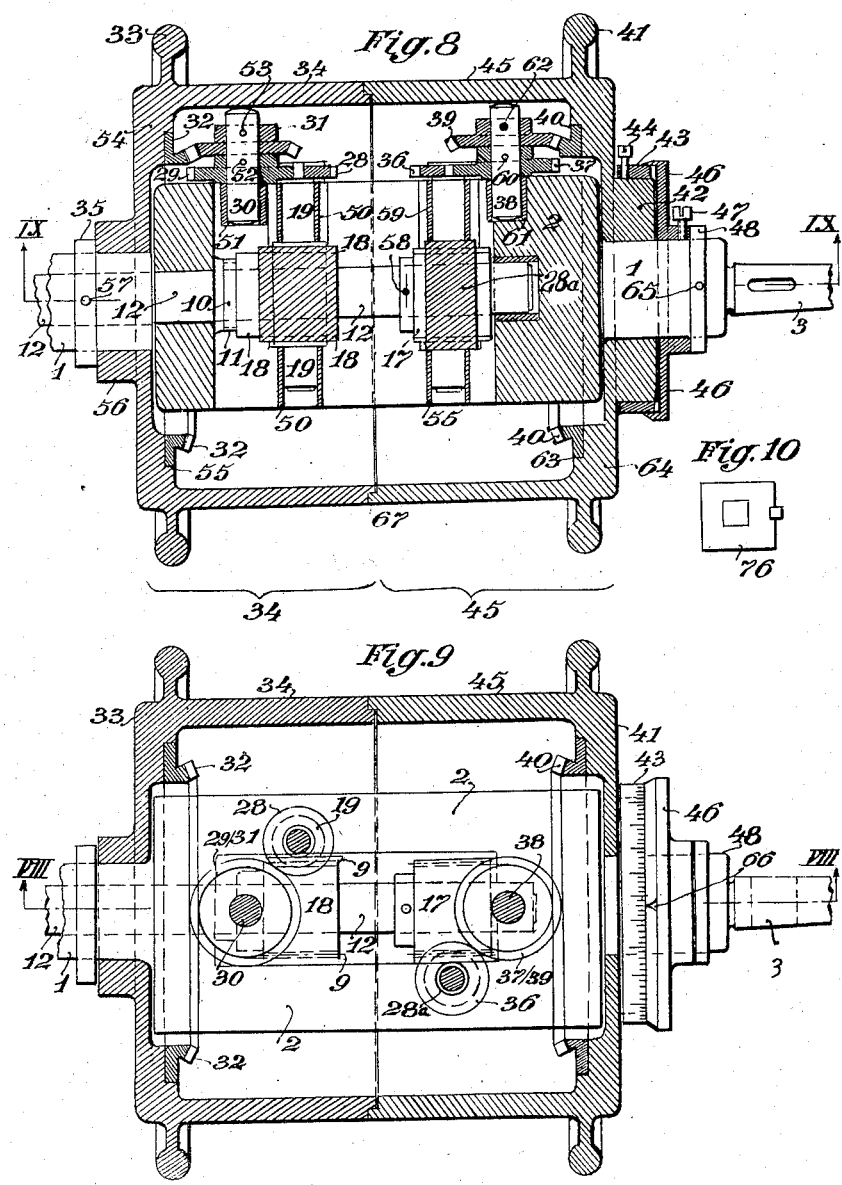

United States Patent Office 2,826,102
Patented Mar. 11, 1958

2,826,102

MECHANICAL BORING BAR

Karl K. Merget, Stockstadt (Main), Germany

Application April 19, 1955, Serial No. 502,264

Claims priority, application Germany March 31, 1955

13 Claims. (Cl. 77—58)

The invention is concerned with a boring bar, especially for vertical and horizontal boring machines, the turning tool or boring tool of which cannot only be adjusted but also clamped into place from the rear end of the boring bar, or from a place near it.

In the boring bars now in use the turning tool or the boring tool had not only to be adjusted but also to be clamped by hand. This was a tedious procedure, as a clamping screw had to be loosened, the tool pushed by hand into the desired position and re-clamped by tightening the clamping screw. Apart from the delaying, time-consuming and inaccurate adjustment of the boring tool, it was further necessary to slide out the boring bar from the hole to be bored as only thus was it possible to reach the boring tool. It was necessary, after re-adjusting and re-clamping, to have the boring tool work from front to rear in the cutting work.

A further disadvantage of these boring bars was the fact that it was not possible to bore recesses and grooves into the interior of the boring to be worked on, or, for instance, to level the rear face of the boring, especially in the case of so-called pocket drillings, which have face ends that are only accessible from the rear.

According to this invention these disadvantages are avoided, as the manipulation of the turning or boring tool is effected from the rear end of the boring tool or from a place near it, that is to say, by way of a head for the reception of the turning or boring tool, which is equipped with a special spiral tooth system, into which the spiral cam of a pressure piece fixed to a pressure spindle engages. This makes it possible, according to the invention, not only to adjust the turning and boring tool by means of the pressure spindle but also to use this same spindle to clamp the turning tool after adjustment. This makes possible highly exact borings, which can only be achieved when the play in the head cam be avoided by clamping.

The invention furthermore consists of a special driving gear, that operates the pressure spindle. This driving gear is devised as a double driving gear, one part of which effects the adjustment of the turning or cutting tool, while the other effects the clamping of this tool. The two parts of the driving gear are housed, for best protection, in two highly dust-proof, closed housing parts; on the outside of the housing parts hand wheels for the required adjustment are provided.

Further details of the invention are explained with the help of the drawings, in which:

Fig. 1 is a one-part boring bar in longitudinal cross-section,

Fig. 2 is a horizontal section of the boring bar in accordance with line II—II of Fig. 1, Fig. 3 is a vertical section of the boring bar carrier, viewed in the direction of the arrow C of Fig. 1, Fig. 4 is a vertical section of the spiral tooth system of the pressure piece, viewed in the direction of the arrow D of Fig. 1, on a larger scale, Fig. 5 is a cross section of the pressure piece in accordance with line V—V of Fig. 4, Fig. 6 illustrates a modified construction of a boring bar consisting of several parts, shown partially in horizontal cross-section, Fig. 7 is a cross section of the modified boring bar taken near the clamping flange in accordance with line VII—VII of Fig. 6, Fig. 8 is a longitudinal cross-section of the driving gear mechanism attached to the boring bar head, taken in accordance with line VIII—VIII of Fig. 9, Fig. 9 is a longitudinal cross-section of the driving gear taken along the line IX—IX of Fig. 8, Fig. 10 is a cross section of a modified form of carrier having a multiple-cornered construction and Fig. 11 is a cross section of a head with a dove-tailed guide groove.

According to the construction of Figures 1 to 5, the boring bar consists of a cylindrical shaft 1, and the boring bar head 2, which is arranged near the rear end and the clamping cone 3 and which serves for coupling with the boring work spindle. The cylindrical shaft 1 has cylindrical borings 4, 5 which lie co-axially one behind the other; and at their point of transition a transverse opening 6 of appropriate size is provided to serve as a guide-way for an easily exchangeable carrier 7. The turning and boring tool 70 is attached to the carrier in a quadrangular recess 71 by means of two clamping screws 72. On one of the long sides of the carrier a rack-shaped spiral tooth system 8 is fixed in a longitudinal groove 80. The carrier has a circular cross section and is secured against torsion by a keyway 73, arranged longitudinally on one side, into which a corresponding key, arranged at the cylindrical shaft 1, engages.

The boring bar head 2 has a recess 9, equipped with a boss 10 at the sides of the carrier through which runs the cylindrical boring 5. Placed into the boring 5 is a pressure spindle 12, which can be revolved and adjusted longitudinally. At its lower, or at its front end (depending on whether this is a vertical or horizontal boring machine) a cylindrical pressure piece 13 is arranged, which is provided at its face with a tooth spiral 14. Near the upper or the rear end of the pressure spindle 12, a spindle piece 15, a pressure collar 16 and at the end a turning collar 17 are arranged. The turning collar 17 is provided with a spiral gearing on the outer periphery, with which a spiral toothed adjustment spindle 28, situated in the boring bar head 2, meshes.

A union nut 18 is screwed onto the outer thread 11 of the boss 10, the inner face 74 of which acts on the pressure collar 16. The outer cylindrical surface of the nut 18 is equipped with a spiral gearing which meshes with the rotatable spiral-toothed spindle 19, also situated in the boring bar head 2.

According to the embodiment shown in Figures 1–5 the manner of operation of this invention is as follows:

After the turning and boring tool has run, effecting the cutting process, through the boring to be worked on, the operator, from his usual operating position, turns the union nut 18 by turning the spiral-toothed spindle 19 in such a way that it can easily be taken off the pressure collar 16. Thus the tooth spiral 14 is loosened at the carrier 7 by way of the pressure spindle 12 and the pressure piece 13. Now the turning collar 17 can be turned by turning the spindle 28 and thus the pressure piece 13 adjusted with the tooth spiral 14 through the pressure spindle 12. This permits the moving, over the spiral tooth system 8, of the head so that the turning tool 70 can be adjusted for the next cutting process as required.

After the carrier is adjusted, the union nut 18 is tightened again by turning the spiral-toothed spindle 19. As a result, the pressure piece 13 clamps the carrier 7 by way of the pressure collar 16, so that the subsequent turning and boring operations can be carried out chatter-free and with the necessary accuracy.

In order to permit the execution of long boring operations the invention provides—according to the construction shown in Figures 6 and 7—that the boring bar is made correspondingly longer, that is to say, it is constructed in several parts. In this embodiment the boring bar consists of the driving bar proper 20 and several intermediate bars of simple construction 21, the carrier bar 22 and the guiding strut 23. In order to keep the weight of the bars down, it is possible to choose a correspondingly smaller guiding strut 23 for the guide piece than the diameter of the boring bar, without adversely affecting the exact guiding of the boring bar. For exact centering a centering gudgeon 24 is provided at one end of the guiding strut 23, which fits into a centered boring 25 of the carrier bar 22 and is screwed together therewith by means of the flange 26.

In so far as the pressure spindle 12 is led through the intermediate bars 21, the centering is effected in each case by means of a centering sleeve 75 arranged on the intermediate bar which fits into a widening 25 similar to a stuffing socket, of the adjoining intermediate bar. Here too, the connection is effected by screws arranged on flanges 26. This multiple-part construction of the boring bar has the advantage of permitting the boring carrier 22 to be moved as desired and the execution of any desired boring lengths. In this construction the pressure bar 12 is also manufactured in several parts. The single parts are fitted into each other by means of multiple-cornered gudgeons 27, which fit into corresponding multiple-cornered recesses, and thus are coupled.

The invention has the advantage of omitting the tedious hand-adjustment of the turning and boring tool, thus saving a considerable amount of time. This is primarily achieved by the fact that the operator does not have to leave his place during the various adjustment processes. By means of the boring bar of this invention it has become possible to bore desired recesses and grooves with a wider diameter than the usual boring hole diameters into boring pieces in the course of long borings. This is of considerable advantage. Furthermore it is possible to automatically level face ends by hand operation and the fitting-on of an indexing switch onto the spiral tooth spindle 8.

In order to execute larger borings chatter-free and to do straight-facing on a larger scale, it is advisable to push on and fasten in the opening 6 boring heads of larger diameter than is required for usual boring. The easily exchangeable head 7 here is replaced by another head of larger measurements which thus corresponds to the larger boring diameter.

According to the modified construction of Figures 8 to 9, the union nut 18, situated in the recess 9 of the boring bar head 2, which clamps the boring tool carrier 7, is equipped on its outside with a spiral tooth system. The rotatable spiral-toothed spindle 19, which is arranged perpendicularly to the union nut and situated in sockets 50 of the boring bar head 2, meshes with said spiral tooth system.

This spindle 19 has at its upper end a spur gear 28, which engages in a spur gear 29 and which is placed in such a way as to be rotatable by means of axle 30 in a journal box 51 that is attached to the boring bar head 2. Here the axle 30 is firmly connected to the spur gear 29 with a transverse pin 52. Over the spur gear 29 a bevel wheel 31 is fastened onto the same axle 30 by means of a pin 53. This bevel wheel engages in a bevel wheel rim 32. This bevel wheel rim is fastened on the inside of the face end 54 in a socket 55 in a housing part 34 that is equipped with a hand wheel 33 on the outside, near the face end 54. The housing part 34 is fastened so as to be rotatable on the boring bar 1 by means of a boss 56 and is protected from longitudinal sliding by the face of the boring bar head 2 on the one hand and an adjusting ring 35 on the other hand, which is fastened to the boring bar 1 by means of a pin 57.

Furthermore, the turning collar 17 at the rear side of the end of the pressure spindle 12 is fastened in the recess of the boring bar head 2 by means of a transverse pin 58. The spiral gearing located on the outside of the turning collar 17 meshes with the spindle 28a, which is perpendicularly arranged to it and which is journalled in the place sockets 59, fastened to the boring bar head—2—by means of its two gudgeon ends. At the upper end of the upper gudgeon a spur gear 36, attached to the spindle 28a, gears into a spur gear 37.

This spur gear 37 is, similar to the spur gear 29, fastened to an axle 38 with a transverse pin 60. The axle 38 is situated so as to be rotatable in a journal box 61 fastened to the boring bar head 2. Above the spur gear 37 a bevel gear 39 is fastened onto the same axle 38 by means of a transverse pin 62. The bevel gear 39 engages with a bevel wheel rim 40 which is fastened in a recess 63 at the inside of the face end 64 of a housing part 45. Near the face 64 of the housing part 45 another hand-wheel 41 is arranged on the outside. The housing part 45 is situated in such a way as to be rotatable at the gudgeon-like end of the boring bar 1 by means of a boss 42 located at the face end 64. In front of the boss 42 the marking ring 46, provided with markers is located on the gudgeon part of the boring bar 1. The marking ring 46 is rotatable, but can be fixed by means of a setscrew 47.

The marking ring 46 is protected from sliding endwise by an adjusting ring 48, fastened with a transverse pin 65 which at the same time prevents endwise movement of the housing part by an appropriate arrangement between one of the face ends of the boring bar head 2 and the face end of the marking ring 46.

The control mechanism functions as follows: By turning the one hand-wheel 33 in the proper direction, the bevel gear 31 and thus the spur gear 29, which is firmly coupled to it, is turned by way of the bevel wheel rim 32. This also effects the corresponding turning of the spur gear 28 and the spiral-toothed spindle 19. Turning of the union nut 18 is thus effected, the inner thread of which unscrews from the outer thread 11 of the boss 10 of the pressure spindle 12. The pressure piece 13 (see Fig. 1) is removed from the boring bar carrier. This makes it possible to move the carrier as described below, as the spiral tooth system of the head has been loosened.

By turning the second hand-wheel 41, the gear wheels 37 and 36 are turned through the bevel rim 40 and the bevel gear 39, so that, by way of the spiral-toothed spindle 28, the turning collar 17 is set into revolution.

This revolution of the turning collar 17 is transmitted to the pressure piece 13 (see Fig. 1) by way of the pressure spindle 12, so that by means of the toothed spiral 14 the boring tool carrier 7 is moved forward or backward according to the turning direction of the hand-wheel 41. After the boring tool is adjusted, the boring tool carrier 7 is again blocked for the working process by turning the other hand-wheel 33 in the direction opposite that mentioned above.

For the micrometer adjustment of the boring tool the scale ring 43 is provided, which ring can be clearly seen in Fig. 9. The ring 43 can be adjusted by means of a setscrew 44. This scale ring turns in front of the index marking 66 of the marking ring 46. This makes it possible, after the boring hole diameter has been established by means of known measuring devices, for both rings, that is to say the scale ring 43 as well as the marking ring 46, to be brought to zero and then clamped tight. This makes it possible to achieve high-precision boring with only the aid of the number scale 43; no other measuring devices being necessary for this process.

The special arrangement of housing parts at the handwheels 33 and 41 which touch each other with very little play at the inner face ends 67, insures the dustproof housing and protection of the driving gear mechanism.

According to the modified construction of Fig. 10 the transverse carrier opening 6 (see Fig. 1) is square-shaped. Corresponding to this the carrier 76 is also of square in cross section. A guide groove is not necessary in this construction of the head.

According to the modification of Fig. 11 the transverse carrier opening 6 is cylindrically shaped. Corresponding to this, the carrier 77 is likewise circular in cross-section and is provided with a guide groove 78 of dovetailed shape. Adjusting elements 79 are provided in groove 78 to permit a certain degree of regulation.

I claim:

1. In a boring bar for boring machines, the combination comprising an elongated cylindrical shaft having a longitudinal central opening, a transverse opening in one end of said shaft, a tool carrier member slidably disposed in said transverse opening, a head structure at the other end of said shaft, said head structure having a central opening communicating with the central opening in said shaft, a tool carrier control spindle disposed in said shaft, said spindle having at one end means operative upon rotation of said spindle to adjust the transverse position of said tool carrier in said transverse opening, means in said head for rotating said spindle for adjusting said tool carrier, and means in said head independent of said rotating means for moving said spindle axially in said shaft so that said one end of said spindle is moved to force said tool carrier into secure locking engagement with the side wall of said transverse opening.

2. In a boring bar for boring machines, the combination comprising an elongated cylindrical boring shaft having a longitudinal central opening, a transverse opening in one end of said shaft, a tool carrier disposed in said opening and movable transversely therein, a gear rack in the side of said tool carrier, a head structure at the other end of said shaft and having a central opening communicating with the central opening of said boring shaft, a tool carrier control spindle rotatable and slidable within said shaft, said spindle having at one end a spiral gear cooperatively disposed with respect to said gear rack in said tool carrier for transversely moving said tool carrier when said spindle is rotated, means in said head for rotating said spindle, and means for moving said spindle axially to force said tool carrier into locking engagement with the side wall of said transverse opening, said axially moving means being controllable independently of said rotating means.

3. The boring bar device defined in claim 2 wherein the axially moving means for said spindle comprises an abutment shoulder on said spindle and within said head structure, a cylindrical collar rotatably disposed on said spindle and abutting said shoulder, gear teeth formed in the outer cylindrical surface of said collar, a gear member journalled with respect to said head structure and cooperatively meshed with the gear teeth in said collar for rotating said collar upon rotation of said gear member, and means responsive to rotation of said collar operative to move said collar axially in said head structure.

4. The invention as defined in claim 3 wherein said rotation responsive means comprises an internally threaded axial opening in said collar, and a cooperative externally threaded boss within said head structure.

5. The invention as defined in claim 2, wherein said transverse opening and tool carrier are circular in cross-section, and keyway means constraining said tool carrier against rotational motion within said transverse opening.

6. The invention as defined in claim 5, wherein said keyway means comprises a dovetail transverse groove in said carrier member and adjustable strips secured to the inner wall of said transverse opening.

7. The invention as defined in claim 2, wherein said transverse opening and said tool carrier are square in cross section.

8. The invention as defined in claim 2 wherein said spindle axial moving and rotating means comprise respective axial moving and rotating gears mounted on said spindle, and a pair of worm gears journalled in said head structure and cooperative respectively with said axial moving and rotating gears.

9. The invention as defined in claim 2, wherein said control spindle is comprised of a plurality of interfitting spindle members, wherein said elongated cylindrical boring shaft is comprised of a plurality of interfitting shaft members, and a cylindrical guide strut concentrically arranged with the tool carrier end of said boring shaft for rotatably supporting said boring bar during machining operations.

10. The invention as defined in claim 9, wherein the interfitting mechanism of said shafts comprises centering sleeves in said shaft members engaging with complementary cylindrical recesses in mutually adjacent ones of said bar members, flanges at the ends of said bar members, and screws interconnecting the flanges of adjacent bar members.

11. The invention as defined in claim 9 wherein said spindle members interfitting means comprises multiple edge gudgeons at one end of said spindle members engaged in respective adjacent corresponding multiple edge recesses in the other ends of said spindles.

12. The invention as defined in claim 2, wherein said spindle axial moving and rotating means comprise an axial moving gear rotatably mounted on said spindle and a rotating gear fixed with respect to said spindle, and a pair of hand-driven side-by-side gear structures rotatable about said head structure and having internal gears, and gear mechanism interconnecting each of said gear structures with said axial moving and rotating gears, respectively, whereby one of said head driven structures serves to transversely move the cutting tool support, and the other of said hand driven structures serves to firmly lock the tool support in transversely adjusted position.

13. The invention as defined in claim 12, wherein said hand driven gear structures comprise a cylindrical housing providing a dust proof enclosure for said interconnecting gear mechanisms.

References Cited in the file of this patent

UNITED STATES PATENTS

| 85,545 | Sullivan | Jan. 5, 1869 |
| 2,258,097 | Menaquale | Oct. 7, 1941 |
| 2,630,027 | Wunderlich | Mar. 3, 1953 |

FOREIGN PATENTS

| 41,084 | Germany | Dec. 1, 1907 |
| 45,829 | Denmark | June 20, 1932 |